United States Patent [19]
Gold et al.

[11] Patent Number: 4,588,173
[45] Date of Patent: May 13, 1986

[54] HYDRAULIC-ELASTOMERIC MOUNT

[75] Inventors: Thomas P. Gold, West Carrollton; Richard A. Muzechuk, Kettering, both of Ohio

[73] Assignee: General Motors Corporation, Detroit, Mich.

[21] Appl. No.: 689,139

[22] Filed: Jan. 7, 1985

Related U.S. Application Data

[63] Continuation-in-part of Ser. No. 554,526, Nov. 23, 1983, abandoned.

[51] Int. Cl.[4] .............................................. F16F 9/10
[52] U.S. Cl. .................................. 267/140.1; 267/8 R
[58] Field of Search .......................... 188/320, 322.15; 248/562; 267/8 R, 63 R, 121, 122, 124, 127, 140.1

[56] References Cited

U.S. PATENT DOCUMENTS

| | | | |
|---|---|---|---|
| 4,277,056 | 7/1981 | Ticks | 267/140.1 |
| 4,437,653 | 3/1984 | Kakimoto | 267/140.1 |
| 4,483,521 | 11/1984 | Kakimoto | 267/8 R |

FOREIGN PATENT DOCUMENTS

| | | | |
|---|---|---|---|
| 0098331 | 1/1984 | European Pat. Off. | 267/140.1 |
| 945899 | 7/1956 | Fed. Rep. of Germany | |
| 2041485 | 9/1980 | United Kingdom | 267/140.1 |
| 2068079 | 8/1981 | United Kingdom | 267/140.1 |

*Primary Examiner*—Duane A. Reger
*Attorney, Agent, or Firm*—R. L. Phillips

[57] ABSTRACT

There is disclosed a hydraulic-elastomeric mount comprising a pair of mounting members that are interconnected by a hollow elastomeric body, an elastomeric diaphragm that closes the elastomeric body to form a closed cavity filled with liquid and a partition and orifice assembly that divides the cavity into a chamber enclosed by the elastomeric body and a chamber enclosed by the diaphragm. The partition and orifice assembly comprises a partition plate that actually separates the chambers and an annular plate wherein the plates have mating faces with oppositely facing channels formed therein that cooperatively define at least one orifice between the plates extending in a plane along and adjacent the periphery of the plates with each of the plates further having an opening therethrough to one end only of the orifice so that it interconnects the chambers and has a length which may thereby be made substantially as expansive as the periphery of the plates or made shorter by shortening one channel relative to the other. There is also a two-piece damping decoupler assembly that fits together through and has a limited travel connection with the partition plate so as to effect limited cyclic volume change in the chambers and thereby permit limited vibratory amplitudes at low frequencies without hydraulic damping.

14 Claims, 15 Drawing Figures

HYDRAULIC-ELASTOMERIC MOUNT

This application is a continuation-in-part of pending U.S. patent application Ser. No. 554,526, filed Nov. 23, 1983 now abandoned.

This invention relates to a hydraulic-elastomeric mount and more particularly to an orifice and hydraulic damping decoupler therefor.

In the typical vibration isolating mount such as used for vehicle engines, a body of natural or synthetic rubber is normally employed. While these elastomeric mounts can be designed to operate in a generally satisfactory manner, such materials inherently have a low coefficient of damping which limits their ability to isolate certain objectionable vibratory inputs to the vehicle such as those particularly disturbing to a modern lightweight unitized vehicle body and frame construction. An increased damping coefficient is possible by the selection of certain rubber polymers and the use of additives but thus far this has proven unsatisfactory because of accompanying adverse affects on other properties of the rubber. Furthermore, this produces large damping for all vibratory inputs regardless of frequency or amplitude which is undesirable in an engine mount particularly in the low amplitude and high frequency ranges. And thus there is a major effort in progress for a cost-effective means of providing a prescribed and varying amount of damping best suited to damping vibrations of varying frequency and amplitude. In the case of an engine mount, this calls for substantially increased damping at certain low frequencies and high amplitudes but relatively low damping at low amplitudes and high frequencies. Furthermore, the damping should be achieved in a way that does not compromise other design considerations such as prescribed stiffness ratios along the major axes and prescribed mount configurations to suit packaging space limitations.

Various vibration isolating mount designs have been proposed adding hydraulic damping, however, they are lacking in various respects and particularly as to a more compact, cost-efficient way of providing a damping orifice with a large length-to-diameter ratio to meet the large damping requirement at low frequency. Then there is also the desire for a more compact, cost-efficient way of effectively preventing hydraulic damping below a certain amplitude which has been found to best isolate very low amplitude vibrations.

The preferred embodiment of the present invention is incorporated with certain features of the hydraulic-elastomeric mount disclosed in copending U.S. patent application Ser. No. 461,612 filed Jan. 27, 1983 and assigned to the assignee of this invention. In the above-disclosed mount, there is a hollow elastomeric body interconnecting a mounting member adapted to be secured to the engine and another mounting member adapted to be secured to the engine supporting structure of the vehicle. An elastomeric diaphragm closes the elastomeric body and forms therewith a closed cavity filled with liquid. A rigid partition divides the cavity into a primary chamber enclosed by the elastomeric body and a secondary chamber enclosed by the diaphragm and an orifice interconnects the chambers so that the liquid is forced to flow at a restricted rate from the primary to the secondary chamber upon contraction of the former and in the opposite direction on expansion thereof to provide a damping effect as the one mounting member vibrates relative to the other. The diaphragm is further configured so as to extend about and also over the periphery of the partition and thereby form a seal between the chambers as well as provide separate sealing thereof. Moreover, the diaphragm is configured to have a certain compliance at its rim permitting limited substantially free or soft travel of the partition forced by the liquid pressure in the chambers below a predetermined low vibration amplitude of one mounting member relative to the other but preventing such relative travel above such amplitude. And thus flow through the orifice and thereby the hydraulic damping is amplitude dependent and does not occur at very low amplitudes just by provision of the diaphragm rim configuration.

According to the present invention, the partition is formed by one of two plates having mating faces adjacent their periphery which are formed so as to cooperatively define an orifice between the plates extending compactly in a plane along and adjacent their periphery. Each of the plates is further formed so as to have a right-angle opening therethrough to one end only of the orifice so that it interconnects the chambers and has a length which may thereby be made substantially as expansive as the periphery of the plates and with the plate not forming the partition then needing only to be of annular or ring-shaped configuration in the formation of the orifice and the one opening thereto. This is of substantial advantage in the highly competitive engine mount business in that the orifice can be made in a very compact and cost-efficient way to have a large enough length-to-diameter ratio so as to peak the hydraulic damping with a certain magnitude at 10 Hz which has been found to be the optimum peak damping frequency for a wide range of vehicle engine mounting applications. Furthermore, it has been discovered that two or more identical orifices of lesser length-to-diameter ratio in parallel connection with the chambers can also locate the peak hydraulic damping at such a prescribed low frequency but with a reduction in the damping magnitude. It has also been discovered that in the case of multiple orifices, they may also be formed with different length-to-diameter ratios so as to produce multiple peaks of damping. The partition design of the present invention is also readily adaptive to the provision of such multiple orifices simply by forming each such orifice in the plate faces as before but now end-to-end with one or more other similarly formed orifices of the same or different cross-section and length.

Another feature is the provision of a hydraulic damping decoupler formed by two simple injection-molded plastic parts that fit together in an opening through the partition plate so as to have limited free travel with respect thereto. A piston formed on one of the decoupler parts operates through the opening in the partition plate with the limited free travel to effect alternating volume change in the chambers so as to permit small vibratory amplitudes at low frequencies without forcing liquid through the orifice to thereby effectively eliminate hydraulic damping at these small vibratory amplitudes and low frequencies for further amplitude control in the mount apart from that provided by the above-described diaphragm rim. This substantially extends the range of usage in that the amplitude control by the diaphragm rim may remain constant while that by the decoupler can be readily changed to meet various amplitude control or damping criteria simply by varying the cross-sectional area and/or stroke of the decoupler piston.

Furthermore, the assembly of the hydraulic-elastomeric mount is simplified in that the partition plate and its orifice plate counterpart may be preassembled in the diaphragm and then mounted therewith on one mounting member as a subassembly. Then at final assembly, this subassembly is simply brought together with and secured to a second subassembly comprising the remaining mounting member with the elastomeric body bonded thereto and while both are submerged in the liquid to assure full fillage of the chambers.

These and other objects, advantages and features of the present invention will become more apparent from the following description and drawings in which:

Referring to the drawings, there is shown a hydraulic-elastomeric mount incorporating the present invention and adapted for mounting an engine in a vehicle. The mount has a generally rectangular shape as viewed from the side in FIG. 1 and a generally oval shape as viewed from the top in FIG. 2 and comprises a yoke-shaped cast aluminum mounting member 10 and an oval dish-shaped stamped sheet metal mounting member 12. The mounting members 10 and 12 each have a pair of studs 14 and 16 respectively projecting outward therefrom for attachment to an engine (not shown) and an engine supporting member such as a frame or cradle (not shown) of the vehicle. A hollow elastomeric body 18 made of natural or synthetic rubber interconnects the mounting members 10 and 12 and to this end, is molded to and about the yoke-shaped mounting member 10 and to both the interior and exterior of an oval-shaped stamped sheet metal retainer 20.

The elastomeric body is configured such that it essentially completely defines a hollow cavity 22 therein extending beneath and about the yoke-shaped mounting member 10 and interiorly of the retaining member 20 so as to positively prevent any leakage from the cavity outwardly past these parts while also having extensive surface attachment therewith. Moreover, the mounting member 10 with its studs 14, the elastomeric body 18 and the retainer 20 form a subassembly shown and designated as 24 in FIG. 4. And it will be seen that the subassembly 24 is configured such that the elastomeric body can be molded to these parts in a conventional two-piece mold without separate or loose core pieces using either injection or transfer molding and with little finishing such as flash rubber removal required. And this includes the formation of directional rate control effecting voids within the elastomeric body itself and as a part of the liquid cavity. For example, with diametrically oppositely located voids 26 (only one of which is exposed in FIG. 1) the mount is provided with a high or hard rate in one crosswise direction and both a relatively soft or low rate at low amplitudes and a non-linear high or hard rate at high amplitudes in a direction transverse thereto (vertical and horizontal direction respectively as viewed from the top in FIG. 2), such differences in rates being especially useful in isolating certain combustion engine vibrations as is well known in the art.

Figure 4:
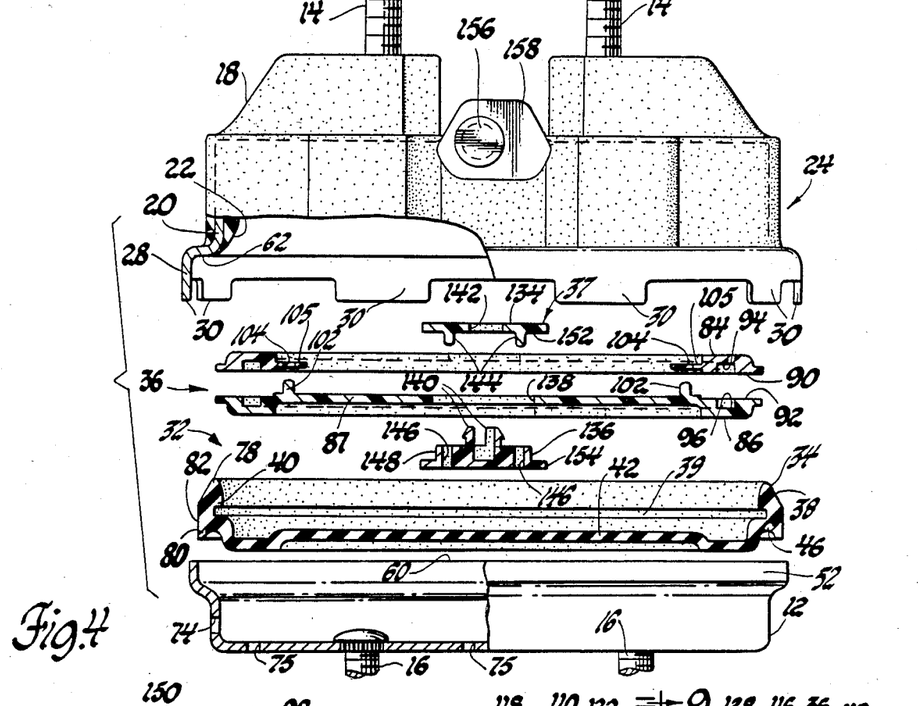
FIG. 4 is an exploded view of certain parts of the hydraulic-elastomeric mount in FIG. 1.

The retainer 20 has an outwardly projecting collar 28 at its lower periphery with a plurality of circumferentially spaced tabs 30 which are initially formed to project straight downward as shown in FIG. 4 to allow the collar 28 to receive a second subassembly 32. The latter subassembly 32 comprises the other mounting member 12, an oval-shaped elastomeric diaphragm 34 of natural or synthetic rubber, an oval-shaped partition and orifice assembly 36 and a hydraulic damping decoupler assembly 37. The elastomeric diaphragm 34 has an annular rim section 38 with a radially inwardly facing internal groove 39 and the shoulder 40 on the side of the groove opposite the spanning central portion 42 of the diaphragm is flexible to receive the periphery of the partition and orifice assembly 36. The periphery of the partition and orifice assembly is thus sandwiched as shown in FIG. 1 between the shoulder 40 and the shoulder 46 on the opposite side of the groove, the latter shoulder being formed integral with and extending radially outward from the central diaphragm portion 42 to join the latter with the diaphragm rim portion 38.

The lower mounting member 12 is formed with a collar 52 to receive the rim 38 of the diaphragm 34 with the partition and orifice assembly 36 in place and the damping decoupler assembly 37 having been previously assembled to the latter as will be described in more detail later and with such subassembly then adapted to be fit into the collar 28 of the retainer 20 of the other subassembly 24 prior to bending over of the tabs 30 to retain the whole mount assembly together. In such fit, the lower mounting member 12 is telescopically received in the retainer collar 28 with the rim 38 of the diaphragm pressed therebetween whereafter the tabs 30 of the retainer are bent over the collar 52 of the lower mounting member to retain the subassemblies 24 and 32 together as shown in FIG. 1. In such assembly, the upper edge 60 of the collar 52 of the lower mounting member 12 engages the radial shoulder 62 of the collar 28 of the retainer 20 to determine the preload on the diaphragm rim 38 which plays a part in amplitude control as well as sealing as will be described in more detail later.

Figure 1:
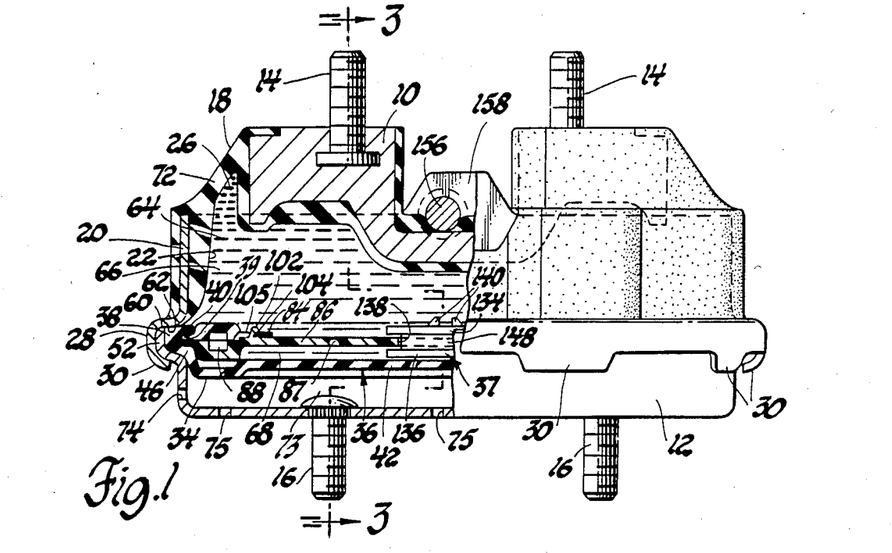
FIG. 1 is a side view partially in section of a hydraulic-elastomeric mount incorporating the preferred embodiment of the present invention.

As seen in FIG. 1, the elastomeric diaphragm 34 closes the elastomeric body 18 so as to form therewith a closed cavity generally designated as 64 which is divided by the partition and orifice assembly 36 into a primary chamber 66 enclosed by the elastomeric body 18 and a secondary chamber 68 enclosed by the diaphragm 34. However, prior to the closure of the cavity 64 at assembly, it is filled, as will be described in further detail later, with a liquid such as a commercial antifreeze that will not freeze in the environment of the intended usage.

Assuming at this point that there is an orifice interconnecting the chambers 66 and 68, liquid in the primary chamber is forced to flow through such orifice at a restricted rate into the secondary chamber upon contraction of the primary chamber and in the opposite direction on expansion thereof to thereby provide a damping effect. Upon contraction of the primary chamber 66, the annular wall section 72 of the elastomericc body 18 extending between the mounting member 10 and the retainer 20 (see FIG. 1) is caused to bulge outwardly while the liquid therein is forced to flow through the orifice into the chamber 68 to expand the latter as permitted by the elasticity of the diaphragm's central portion 42. Then on reversal in amplitude and resultantly expansion of the primary chamber 66, the stretched central diaphragm portion 42 retracts and thereby contracts the secondary chamber 68 forcing the liquid to flow back through the orifice into the primary chamber to complete the damping cycle. To assure otherwise free expansion and contraction of the secondary chamber 68, the space 73 between the diaphragm 34 and the lower mounting member 12 is vented to atmosphere through a plurality of radial holes 74 formed in the side of the latter part. In addition, a plurality of drain holes 75 are provided in the bottom of the mounting member 12 to prevent the accumulation of water therein which might freeze and present an obstacle to the movement of the diaphragm 34.

By virtue of the diaphragm 34 being configured at its rim 38 to both extend around and over the periphery of the partition and orifice assembly 36, there is formed a seal not only between the chambers but also a double seal between the chambers and the exterior resulting in excellent sealed integrity of the mount. Moreover, the diaphagm rim 38 is configured so as to permit limited substantially free or soft travel of the partition and orifice assembly 36 relative to the mounting members 10 and 12 below a predetermined low vibration amplitude of one mounting member relative to the other and to prevent such relative travel above such amplitude so that flow through the orifice between the chambers to effect damping does not occur until such prescribed low vibration amplitude is exceeded. For example, such free travel of the partition and orifice asembly 36 may be as much as ±1.0 mm depending on the installation.

This limited substantially uninhibited partition movement provides precise amplitude control and is simply effected with a predetermined compliance of the diaphragm rim 38 between the sandwiching retainer 20 and lower mounting member 12. To this end, the diaphragm rim 38 is free formed as shown in FIG. 4 so as to have oppositely facing annular sealing beads 78 and 80 at the outer perimeter and thinner but more radially extensive wall sections in the groove shoulders 40 and 46 which sandwich the periphery of the partition and orifice assembly 36. There is thus substantially more compliance of the sealing beads 78 and 80 which flatten at assembly to effect tight sealing while the partition capturing elastomeric shoulder or wall sections 40 and 46 are preloaded to a predetermined extent dependent on the amplitude responsiveness desired.

Furthermore as to the sealing, the diaphragm rim has an oval periphery 82 that is forced to engage the interior of the retainer collar 52 when the diaphragm rim 38 is clamped during final assembly and thereby cooperates with both of the face sealing beads 78 and 80 to provide double sealing between the chambers 66, 68 and atmosphere. On the other hand, the hydraulically biased partition and orifice assembly 36 is alternately forced against the elastomeric shoulders 40 and 46 of the diaphragm rim so as to maintain tight sealing between the chambers 66 and 68. For example, assuming that the primary chamber 66 is contracting and the hydraulic pressure therein is increasing, the partition and orifice assembly 36 is then pressed into very tight sealing contact with the lower shoulder 46 while the upper shoulder 40 is relaxing with such partition movement and while the double sealing provided by the sealing beads 78 and 80 remains substantially unaffected because of their effective isolation therefrom by reason of their separate compliance. Then when the secondary chamber 68 is contracting, the hydraulic pressure therein is increasing during the remainder of each damping cycle, the partition and orifice assembly 36 is hydraulically pressed into very tight sealing contact with the shoulder 40 to thereby maintain tightly sealed integrity between the chambers while the other chamber 66 relaxes and while double sealing is maintained between the chambers and atmosphere by the sealing beads 78 and 80.

The hydraulic-elastomeric mount as thus far described, apart from the general configuration (oval versus circular) and most particularly the partition and orifice assembly 36 and the damping decoupler assembly 37, is similar to that disclosed in the afore-mentioned copending U.S. patent application Ser. No. 461,612 which is hereby incorporated by reference. And reference is made thereto for a more detailed understanding of the various operating characteristics of the mount as compared with those of a typical conventional mount having only an elastomeric body.

Figures 2, 3:
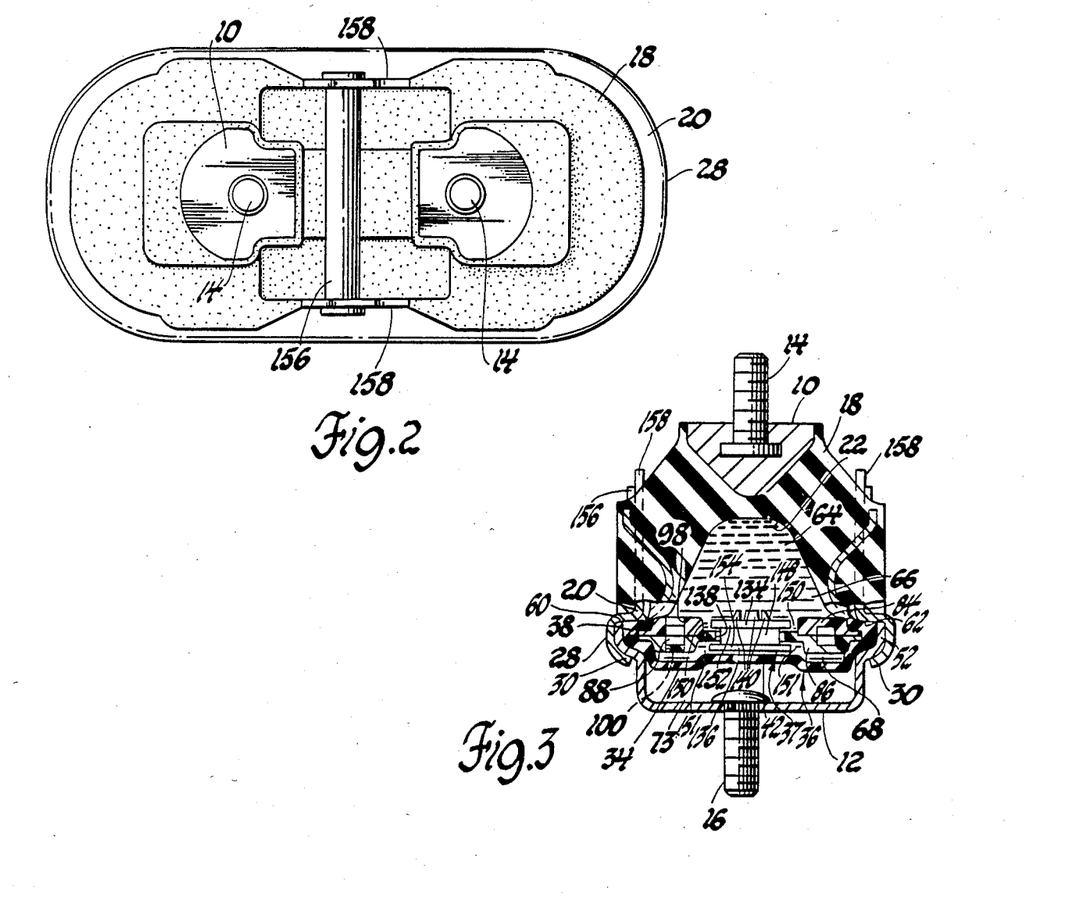
FIG. 2 is a top view of the hydraulic-elastomeric mount in FIG. 1.
FIG. 3 is a sectional view taken along the line 3—3 in FIG. 1.
Figure 5:
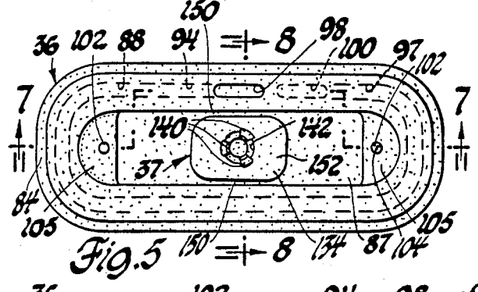
FIG. 5 is a reduced top view of the orifice defining partition and amplitude control displacement device in the hydrualic-elastomeric mount in FIG. 1.

Describing now the details of the preferred embodiment of the present invention, the partition and orifice assembly 36 is of two-piece injection molded plastic construction and comprises a pair of oval-shaped plates 84 and 86 with matching peripheries. As best seen in FIGS. 1 and 3, the lower plate 86 has a cavity spanning wall 87 which acts to separate the chambers 66 and 68 while the upper plate 84 simply serves to cooperate with the lower partition plate to define in a minimum of space a damping orifice 88 interconnecting the two chambers in a manner such that the latter plate requires substantially less material since it then need only be of annular or ring-shaped configuration as shown. To this end, the upper annular plate 84 and the lower partition plate 86 have flat annularly extending mating faces 90 and 92 which in the embodiment shown in FIGS. 1-5, 7 and 8 are each formed with a single double-ended channel 94 and 96 therein which are of uniform depth and cross-section and wall thickness, and which cooperatively define the orifice 88 as a planar (nonspiraling) passage extending between the plates along and adjacent their periphery in an oval path just inwardly of and along the diaphragm rim 38. In addition, the plates 84 ad 86 are each formed with an oval-shaped right-angle opening 98 and 100 therethrough to one end only of their respective channel 94 and 96 and thereby to one end only of the orifice 88 so that it interconnects the chambers and has a length which may thereby be made substantially as expansive as the periphery of the plates as best seen in FIG. 5. Furthermore, it will be appreciated that a minimum of space is utilized in the formation of the orifice 88 and its interconnection with the chambers by reason of its planar layout and right-angle openings 98 and 100. Preferably, the cross-section of the channels 94 and 96 is rectangular and that of the orifice 88 is square for ease in mold making but it will be understood that the orifice could be formed with some other cross-sectional shape such as circular and also that the orifice could be formed with just one channel in the face of either of the plates. Also, for comparison purposes as to the commonly used dimensionless parameter of length-to-diameter ratio it will be assumed that the effective diameter of an orifice having a non-circular cross-section like that disclosed is approximately that of a circle having the equivalent area of such noncircular cross-section.

Furthermore, it has been found that the flow transition through such a right-angle opening to the orifice at each end can affect the peak damping frequency with the tendency to depress or lower same as the entering flow grows turbulent. However, it has been discovered that by simply making the flow area of the right-angle openings 98 and 100 about three times (3x) that of the orifice 88 the flow transition is maintained sufficiently smooth that it will not shift the peak damping frequency to any substantial degree.

Alignment of the channels 94 and 96 in defining the orifice is assured by forming the partition plate 86 with two right-angle pins 102 which are received in holes 104 formed in transverse webs 105 made integral with the annular plate 84 at locations inwardly of the channels. With the plates 84 and 86 accurately aligned by the pin and hole locators, it has been discovered that they need not be further retained together by the pins or some additional fastening against separation of their mating faces 90 and 92 as the preload on the diaphragm rim 38 at final assembly acting at the shoulders 40 and 46 of the rim groove 39 which captures the rims of the plates provides an adequate clamping load to maintain the plate faces in tightly sealed contact. As a result, there is no need to hold close tolerances on the height of the pins 102 nor between the faces of the locator webs 105 on the annular plate 84 and the partition wall 87 formed with the other plate 86.

The plates 84 and 86 thus in a very compact and efficient way form the orifice 88 such that it can be made with a large effective length-to-diameter ratio such as in the range of 20–40 so as to peak the hydraulic damping with a certain magnitude at 10 Hz which has been found to be the optimum or best peak damping frequency for a wide range of vehicle engine mounting applications including both spark ignition and diesel type engines. But it has also been discovered that two or more identical orifices of lesser length-to-diameter ratio in parallel connection with the chambers can also be used to locate the peak hydraulic damping at such a prescribed low frequency but with an accompanying reduction in damping magnitude. Moreover, it has been discovered that with multiple orifices they may also be formed with different length-to-diameter ratios so as to provide multiple peaks of damping to aid in tuning to a prescribed damping response pattern and particularly where the major damping is to be spread over a wide frequency band and/or is to be kept relatively low.

Figure 6:
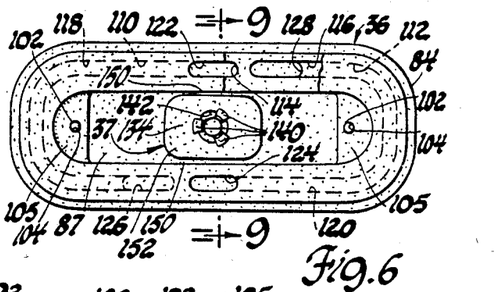
FIG. 6 is a view similar to FIG. 5 of another embodiment of the orifice defining partition.
Figures 7, 8, 9:
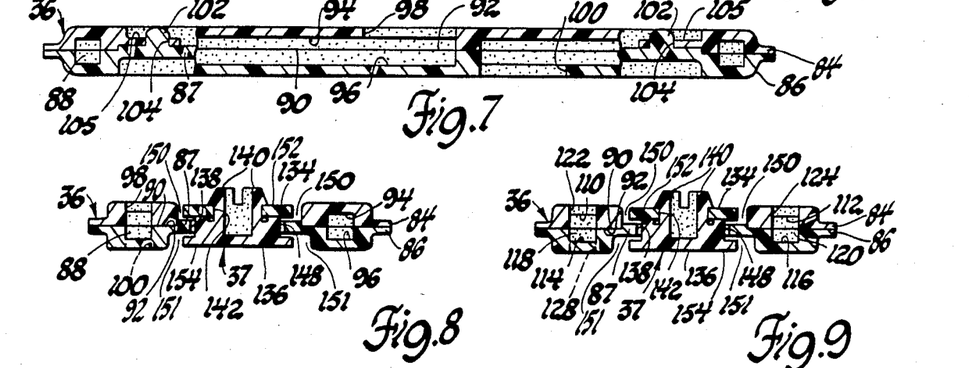
FIG. 7 is an enlarged sectional view taken along the line 7—7 in FIG. 5.
FIG. 8 is a sectional view taken along the line 8—8 in FIG. 5.
FIG. 9 is a sectional view taken along the line 9—9 in FIG. 6.

The combined partition and orifice design of the present invention is also readily adaptive to the provision of such multiple orifices simply by forming each such orifice in the partition plates as before but now end-to-end with one or more other similarly formed orifices extending along the periphery of the two-piece partition. The provision of two such orifices in parallel is shown in FIGS. 6 and 9. In this case the plates 84 and 86 are then formed with two double-ended channels 110, 112 and 114, 116 in their respective faces 90 and 92. The channels in each plate are arranged end-to-end and cooperatively define with the complementary channels in the other plate two separate orifices 118, 120 between the plates arranged end-to-end along and adjacent the periphery of the plates. Then like before, the plates 84 and 86 each have an opening 122, 124 and 126, 128 therethrough to one end only of their respective channels and thereby to each orifice 118, 120 to connect them in parallel with the chambers 66 and 68. And because of their oval layout, the total length of the two orifices may still be made substantially as expansive as the periphery of the plates. And thus for example, if in the FIG. 5 embodiment the length-to-diameter ratio of the orifice 88 is prescribed at 30, the length-to-diameter ratio for the two orifices 118 and 120 in the FIG. 6 embodiment could be made approximately half that or 15 to locate the peak damping at approximately the same low frequency.

Turning then to the hydraulic damping decoupler assembly 37, this device is also simply formed by two simple injection-molded plastic parts 134 and 136 but which in this case are fixed to each other by a snap-fit connection through a central opening 138 in the single partition wall 87 formed with the partition plate 86 so as to have limited free travel with respect thereto as shown in both embodiments of the partition and orifice assembly 36. The snap-fit connection is provided by the formation of three upstanding prongs 140 on the lower decoupler part 136 which engage through the partition plate opening 138 and with a central round hole 142 in the other decoupler part 134. In addition, two downwardly projecting locator pins 144 formed on the underside of the upper decoupler part 134 are received in holes 146 in the lower decoupler part 136 to retain the parts in proper relative location.

Limited volume change in the chambers 66 and 68 to effect hydraulic decoupling (elimination of the hydraulic damping) below a prescribed low amplitude at low frequencies is provided by the lower decoupler part 136 being formed with an upstanding piston or volume displacement portion 148 which is slidably received in the partition plate opening 138. The opening 138 thus serves as a cylinder for the piston 148 which has a height greater than the cylinder length (i.e. the thickness of the partition wall 87) so as to have limited travel or stroke with respect thereto as determined by the rims of the decoupler parts which sandwich and are sealingly abuttable with the opposite sides of the partition wall 87 about the opening 138 as best seen in FIGS. 8 and 9. And because the limited free travel is dependent in part on only one wall thickness which is that of the single partition wall 87, the decoupler tolerance is much simpler to control than if there was a double wall. Moreover, the piston 148 and its cylinder 138 have a rectangular cross-section and profile respectively so as to prevent the decoupler from turning in the partition to maintain the side clearances 150 and 151 between the decoupler parts 134 and 136 and the respective plates 84 and 86.

The decoupler parts 134 and 136 each have an identical low profile rectangular box shape 152 and 154 occupying the respective chambers and the decoupler piston 148 by virtue of its limited free travel with respect to the partition in response to slow alternating pressure buildup in the two chambers 66 and 68 effects cyclic volume change in the chambers so as to permit small vibratory amplitudes at low frequencies such as up to 2 Hz without forcing liquid to flow therebetween through the one orifice 88 in the case of the FIG. 5 embodiment or the two orifices 118 and 120 in the case of the FIG. 6 embodiment. This effectively eliminates hydraulic damping below a prescribed low vibratory amplitude for further amplitude control in the mount apart from that provided by the above-described diaphragm rim 38 with its designed in compliance. The damping decoupler assembly 37 also substantially extends the range of usage of the mount in that the amplitude control by the diaphragm rim is relatively limited and may better remain constant in size so as not to require changes in the associated other parts while the damping decoupler can be readily changed to meet various amplitude control criteria without requiring other changes in the mount simply by varying the cross-sectional area and/or stroke of the decoupler piston 148.

Furthermore, it will be appreciated that the assembly of the hydraulic-elastomeric mount is simplified in that the two plates 84 and 86 forming the partition and orifice assembly 36 may be preassembled and thereafter the two parts 134 and 136 forming the damping decoupler assembly 37 may be preassembled on the former assembly and that all these parts may be preassembled in the diaphragm 34 and then mounted therewith on the lower mounting member 12 to form the subassembly 32. Then at final assembly, this main subassembly is simply brought together with and secured by the tabs 30 to the retainer 20 of the other main subassembly 24 and preferably while both these subassemblies are fully submerged in the lqiuid to assure full fillage of the chambers.

Also, it will be recalled that the retainer 20 is connected by the elastomeric body 18 to the upper mounting member 10 but is mechanically connected to the lower mounting member 12 by the bent over tabs 30 at final assembly. To assure that the mounting members 10 and 12 remain connected in the event that the elastomeric connection between the retainer 20 and the mounting member 10 is lost, there is provided a steel pin 156 which straddles the yoke-shaped mounting member 10 between its studs 14 and is secured at its opposite ends to a pair of upstanding flanges 158 formed on the retainer 20 as shown in FIGS. 1-4.

Figure 10:
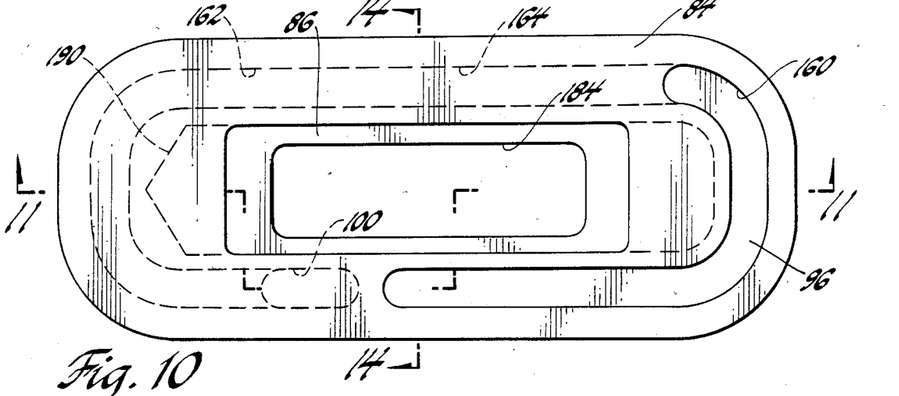
FIG. 10 is a plan view of another embodiment of the orifice defining partition for the hydraulic-elastomeric mount in FIG. 1.
Figure 11:
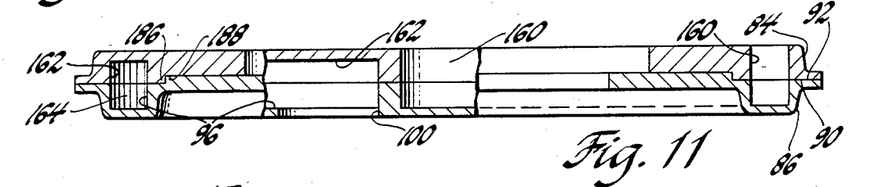
FIG. 11 is a sectional view taken along the line 11—11 in FIG. 10.
Figure 13:
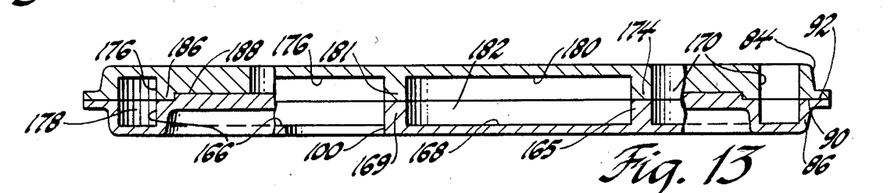
FIG. 13 is a view taken along the line 13—13 in FIG. 12.
Figure 14:
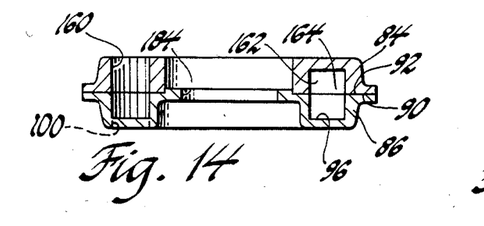
FIG. 14 is a view taken along the line 14—14 in FIG. 10.
Figure 15:
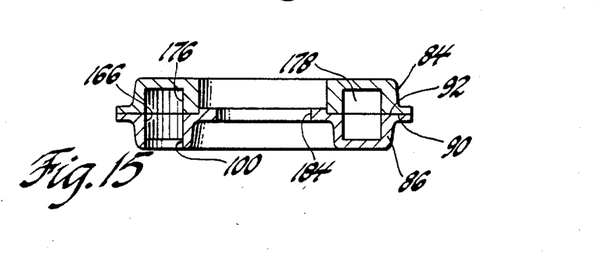
FIG. 15 is a view taken along the line 15—15 in FIG. 12.

In tuning the hydraulic damping of the mount for a particular application, it has also been found that the effective length of the orifice can be varied with only minimal modification of the partition tooling simply by designing the channel in one of the partition plates shorter than that in the other. This is demonstrated by the two additional embodiments shown in FIGS. 10-15 of the single orifice design in FIG. 5 and wherein like numbers are used to identify corresponding parts except for the modifications where new numbers are then used. Referring to the embodiment in FIGS. 10, 11 and 14, the plates 84 and 86 which may also be formed as die cast aluminum parts as shown, have as before the flat annularly extending mating faces 90 and 92 and like in the embodiment in FIG. 5 are each formed with a single double-ended channel. However, whereas the channel 96 and opening 100 remain unchanged in the partition plate 86, there is now formed a longer opening 160 and resultantly a shorter channel 162 in the other (annular) plate 84 and thereby a shorter length orifice 164 to reduce the hydraulic damping effect. As seen in FIG. 10, the opening 160 as the result of the particular elongation to arrive at a specified damping effect takes on a J-shape whereas before it was simply oval to the flow direction. However, it will be understood that the resulting shape of this opening will vary with the damping change desired as will be demonstrated along with improved sealing of the orifice by the embodiment in FIGS. 12, 13 and 15.

Figure 12:
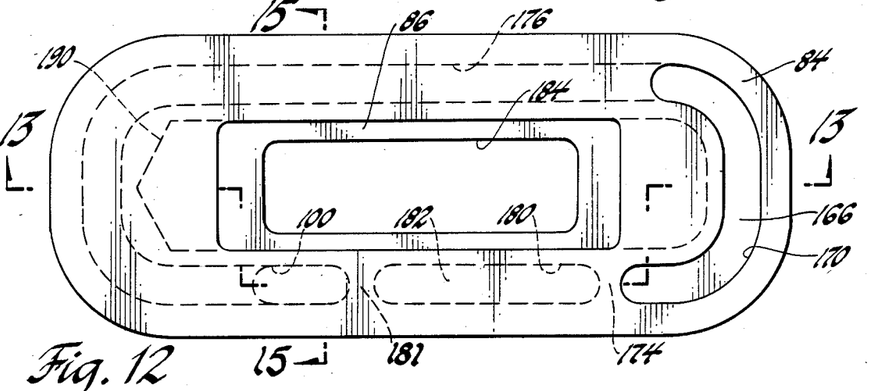
FIG. 12 is a plan view partially broken away of another embodiment of the orifice defining partition for the hydraulic-elastomeric mount in FIG. 1.

In the latter embodiment, the opening 100 in the partition plate 86 remains unchanged but now there is formed a dam 165 across the channel therein nearer the other end resulting in a shorter channel 166 in this plate that is blocked from the remaining channel portion 168 which is already blocked from the opening by the dam 169. Then in the other plate 84, there is now formed an opening 170 of C-shape as seen in FIG. 12 shorter than that in FIG. 10 by the length of the blocked channel portion 168 and resultantly a correspondingly longer channel in this plate as compared with that in FIG. 10. However, a dam 174 is now also formed across the channel in plate 84 opposite that in plate 86 resulting in a channel 176 in the plate 84 of length such as to form with the other channel 166 an orifice 178 the same length as the orifice 164 in FIG. 10. But moreover, there is a remaining channel portion 180 in the plate 84 that is already blocked from the opening 100 by the dam 181 and is thus blocked like the channel portion 168 in the plate 86 where their dams 165 and 174 interface at the respective plate faces 92 and 90. As a result, there is formed a dead space 182 by the dead-ended channel portions 168 and 180 to prevent leakage past the plate faces 90 and 92 between the openings 170 and 100 that would bypass the orifice 178.

Furthermore, it will be seen in both the embodiments in FIGS. 10-15 that the damping decoupler effect can readily be increased with an elongated opening or cylinder 184 therefor in the partition plate 86 fitted with a hydraulic damping decoupler, similar to 37 in FIGS. 1-9. Moreover, it will be seen that the alignment pins and holes have been removed from the plates 84 and 86 and instead the interfacing inner shoulders 186 and 188 are utilized for the purpose of aligning the orifice defining channels. In addition, such shoulder may be formed with a one-way only fit as with a pointed outline 190 at one end as seen in FIGS. 10 and 12.

The hydraulic-elastomeric mount by benefit of the present invention may thus be readily adapted and tuned to meet a specific application to give the desired amplitude control as well as the coefficient of damping and resulting dynamic rate best suited to isolate a particular set of vibration conditions. And thus a family of mounts is cost-effectively offered with selectability of such important parameters as dynamic rate as well as amplitude control and in a very compact manner. Furthermore, it will be appreciated by those skilled in the art that while the specific embodiments shown and described in detail are the preferred construction, other practical embodiments may result from these teachings.

The above described preferred embodiments are thus illustrative of the invention which may be modified within the scope of the appended claims.

The embodiments of the invention in which an exclusive property or privilege is claimed are defined as follows:

1. A hydraulic-elastomeric mount comprising a pair of mounting members, a hollow elastomeric body interconnecting said mounting members, an elastomeric diaphragm configured so as to close said elastomeric body and form therewith a closed cavity that is filled with liquid, a partition dividing said cavity into a chamber enclosed by said elastomeric body and a chamber enclosed by said diaphragm characterized in that said partition comprises a partition plate that solely separates said chambers, an annular plate, said plates having mating faces formed so as to cooperatively define at least one orifice therebetween extending in a plane and along and adjacent the periphery of said plates, and each of said plates having an opening therethrough to one end only of said orifice so that said orifice interconnects said chambers.

2. A hydraulic-elastomeric mount comprising a pair of mounting members, a hollow elastomeric body interconnecting said mounting members, an elastomeric diaphragm configured so as to close said elastomeric body and form therewith a closed cavity that is filled with liquid, a partition dividing said cavity into a chamber enclosed by said elastomeric body and a chamber enclosed by said diaprhagm, characterized in that said partition comprises a partition plate that solely separates said chambers, an annular plate, said plates having mating faces formed so as to cooperatively define a plurality of separate orifices therebetween arranged end-to-end and extending in a plane and along and adjacent the periphery of said plates, and each of said plates having an opening therethrough to one end only of each said orifice so that each orifice interconnects said chambers whereby said orifices are all connected in parallel between said chambers and have a total length which may thereby be made substantially as expansive as the periphery of said plates.

3. A hydraulic-elastomeric mount comprising a pair of mounting members, a hollow elastomeric body interconnecting said mounting members, an elastomeric diaphragm configured so as to close said elastomeric body and form therewith a closed cavity that is filled with liquid, a partition dividing said cavity into a chamber enclosed by said elastomeric body and a chamber enclosed by said diaphragm, characterized in that said partition comprises a partition plate that solely separates said chambers, an annular plate, said plates having mating planar faces adjacent their periphery, said faces each having at least one channel of uniform cross-section therein extending along and adjacent the periphery of the respective plate and cooperating with a complementary channel in the face of the other plate to define an orifice between said plates extending in a plane and along and adjacent their periphery, and each of said plates having an opening therethrough to one end only of the channel therein and thereby to one end only of said orifice so that said orifice interconnects said chambers.

4. A hydraulic-elastomeric mount as set forth in claim 3 wherein said channels each have a dam therein so as to also cooperatively define an elongated dead space between said openings that is closed at each end at said faces.

5. A hydraulic-elastomeric mount as set forth in claim 3 wherein the channel in one of said plates is substantially shorter than that in the other plate and determines the effective length of the orifice.

6. A hydraulic-elastomeric mount as set forth in claim 5 wherein the opening in said one plate is elongated to effect shortening of the channel therein.

7. A hydraulic-elastomeric mount comprising a pair of mounting members, a hollow elastomeric body interconnecting said mounting members, an elastomeric diaphragm configured so as to close said elastomeric body and form therewith a closed cavity that is filled with liquid, a partition dividing said cavity into a chamber enclosed by said elastomeric body and a chamber enclosed by said diaphragm, characterized in that said partition comprises a partition plate that solely separates said chambers, an annular plate, said plates having mating planar faces adjacent their periphery, said faces each having at least one channel of uniform cross-section therein extending along and adjacent the periphery of the respective plate and cooperating with a complementary channel in the face of the other plate to define an orifice between said plates extending in a plane and along and adjacent their periphery, each of said plates having an opening therethrough to one end only of the channel therein and thereby to one end only of said orifice so that said orifice interconnects said chambers and has a length which may thereby be made substantially as expansive as the periphery of said plates, and said openings being at right-angles to said orifice and having a flow area about three times that of said orifice.

8. A hydraulic-elastomeric mount comprising a pair of mounting members, a hollow elastomeric body interconnecting said mounting members, an elastomeric diaphragm configured so as to close said elastomeric body and form therewith a closed cavity that is filled with liquid, a partition dividing said cavity into a chamber enclosed by said elastomeric body and a chamber enclosed by said diaphragm, characterized in that said partition comprises a partition plate that solely separates said chambers, an annular plate, said plates having mating planar faces adjacent their periphery, said faces each having a plurality of separate channels of uniform cross-section therein arranged end-to-end along and adjacent the periphery of the respective plate and cooperating with complementary channels in the face of the other plate to define a plurality of separate orifices between said plates extending in a plane and along their periphery, and each of said plates having an opening therethrough to one end only of each channel therein and thereby to one end only of the respective orifice so that each orifice interconnects said chambers whereby said orifices are all connected in parallel between said chambers and have a total length which may thereby be made substantially as expansive as the periphery of said plates.

9. A hydraulic-elastomeric mount comprising a pair of mounting members, a hollow elastomeric body interconnecting said mounting members, an elastomeric diaphragm configured so as to close said elastomeric body and form therewith a closed cavity that is filled with liquid, a partition dividing said cavity into a chamber enclosed by said elastomeric body and a chamber enclosed by said diaphragm, characterized in that said partition comprises a pair of plates peripherally sealingly mounted and retained together in a rim of said diaphragm, said plates having mating faces formed so as to cooperatively define at least one orifice therebetween extending along and adjacent the periphery of said plates, and each of said plates having an opening therethrough to one end only of said orifice so that said orifice interconnects said chambers.

10. A hydraulic-elastomeric mount comprising a pair of mounting members, a hollow elastomeric body interconnecting said mounting members, an elastomeric diaphragm configured so as to close said elastomeric body and form therewith a closed cavity that is filled with liquid, a partition dividing said cavity into a chamber enclosed by said elastomeric body and a chamber enclosed by said diaphragm, characterized in that said partition comprises a molded plastic partition plate solely separating said chambers, a molded plastic annular plate, said plates having mating faces formed so as to cooperatively define at least one orifice therebetween extending in a plane and along and adjacent the periphery of said plates, and each of said plates having an opening therethrough to one end only of said orifice so that said orifice interconnects said chambers.

11. A hydraulic-elastomeric mount comprising a pair of mounting members, a hollow elastomeric body interconnecting said mounting members, an elastomeric diaphragm configured so as to close said elastomeric body and form therewith a closed cavity that is filled with liquid, a partition dividing said cavity into a chamber enclosed by said elastomeric body and a chamber enclosed by said diaphragm, characterized in that said partition comprises a partition plate solely separating said chambers, an annular plate, said plates having mating faces formed so as to cooperatively define at least one orifice therebetween extending along and adjacent the periphery of said plates, each of said plates having an opening therethrough to one end only of said orifice so that said orifice interconnects said chambers, and hydraulic damping decoupler means comprising a pair of parts adapted to be secured together through an opening in said partition plate so as to have limited free travel relative thereto, one of said parts having a piston portion received in said opening and extendable at opposite ends into said chambers so as to effect cyclic volume change in said chambers with said limited free travel to thereby permit vibratory amplitudes below a prescribed level without forcing liquid through said orifice and thus without hydraulic damping.

12. A hydraulic-elastomeric mount comprising a pair of mounting members, a hollow elastomeric body interconnecting said mounting members, an elastomeric diaphragm configured so as to close said elastomeric body and form therewith a closed cavity that is filled with liquid, a partition dividing said cavity into a chamber enclosed by said elastomeric body and a chamber enclosed by said diaphragm, characterized in that said partition comprises a partition plate solely separating said chambers, an annular plate, said plates having mating faces formed so as to cooperatively define at least one orifice therebetween extending along and adjacent the periphery of said plates, each of said plates having an opening therethrough to one end only of said orifice so that said orifice interconnects said chambers, and hydraulic damping decoupler means comprising a pair of molded plastic parts adapted to be secured together through an opening in said partition plate so as to have limited free travel relative thereto, a piston integral with one of said decoupler parts received in said opening and extendable at opposite ends into said chambers so as to effect cyclic volume change in said chamber with said limited free travel to thereby permit vibratory amplitudes below a prescribed level without forcing liquid through said orifice and thus without hydraulic damping.

13. A hydraulic-elastomeric mount comprising a pair of mounting members, a hollow elastomeric body interconnecting said mounting members, an elastomeric diaphragm configured so as to close said elastomeric body and form therewith a closed cavity that is filled with liquid, a partition dividing said cavity into a chamber enclosed by said elastomeric body and a chamber enclosed by said diaphragm, an orifice interconnecting said chambers, a compliant rim on said diaphragm supporting said partition so as to effect alternating volume change in said chambers without forcing liquid through said orifice at vibratory amplitudes below a prescribed level to thereby eliminate hydraulic damping by said orifice at such amplitudes, characterized by hydraulic damping decoupler means comprising a pair of parts adapted to be secured together through an opening in said partition so as to have limited free travel relative thereto, said decoupler parts having a piston extending therebetween received in said partition opening and extendable at opposite ends into said chambers so as to effect cyclic volume change in said chambers with said limited free travel in addition to and independent of that provided by said compliant diaphragm rim to thereby further permit vibratory amplitudes below said prescribed level without forcing liquid through said orifice and thus without hydraulic damping.

14. A hydraulic-elastomeric mount comprising a pair of mounting members, a hollow elastomeric body interconnecting said mounting members, an elastomeric diaphragm configured so as to close said elastomeric body and form therewith a closed cavity that is filled with liquid, a partition dividing said cavity into a chamber enclosed by said elastomeric body and a chamber enclosed by said diaphragm, an orifice interconnecting said chambers, characterized by hydraulic damping decoupler means comprising a pair of parts adapted to be secured together through an opening in said partition by a piston integral with one of said parts slidably received in said opening, said parts sandwiching said partition therebetween about said opening and being spaced relative to each other so that said piston has limited free travel in said opening extending into said chambers so as to effect cyclic volume change in said chambers permitting vibratory amplitudes below a prescribed level without forcing liquid through said orifice and thus without hydraulic damping.

* * * * *